United States Patent [19]

Wojtowicz

[11] 4,380,533

[45] * Apr. 19, 1983

[54] PROCESS FOR THE PRODUCTION OF DIBASIC MAGNESIUM HYPOCHLORITE

[75] Inventor: John A. Wojtowicz, Cheshire, Conn.

[73] Assignee: Olin Corporation, New Haven, Conn.

[*] Notice: The portion of the term of this patent subsequent to Jan. 31, 1995, has been disclaimed.

[21] Appl. No.: 281,534

[22] Filed: Jul. 8, 1981

Related U.S. Application Data

[63] Continuation-in-part of Ser. No. 129,812, Mar. 12, 1980, abandoned, and a continuation-in-part of Ser. No. 968,605, Dec. 11, 1978, abandoned.

[51] Int. Cl.$^3$ .................................................. C01B 11/06
[52] U.S. Cl. ............................................................. 423/473
[58] Field of Search .................. 423/473, 474, 164, 636

[56] References Cited

U.S. PATENT DOCUMENTS

| | | | |
|---|---|---|---|
| 1,713,668 | 5/1929 | MacMullin | 423/474 |
| 2,441,337 | 5/1948 | Sprauer | 423/474 |
| 3,294,485 | 12/1966 | Mayer | 423/164 |
| 3,582,265 | 6/1971 | Bishop | 423/473 |
| 3,895,099 | 7/1975 | Sakowski | 423/474 |
| 4,071,605 | 1/1978 | Wojtowicz | 423/473 |

*Primary Examiner*—Brian E. Hearn
*Attorney, Agent, or Firm*—James B. Haglind; Donald F. Clements

[57] ABSTRACT

A process is described for the production of dibasic magnesium hypochlorite which comprises reacting a magnesium salt with an aqueous slurry of a crystalline hypochlorite salt in a reaction mixture containing a chloride ion source. The aqueous slurry has a solids content of from about 10 to about 90 percent by weight of a hypochlorite salt such as an alkali metal hypochlorite or calcium hypochlorite. The process provides a dibasic magnesium hypochlorite product which is readily separated.

Dibasic magnesium hypochlorite, $Mg(OCl)_2 \cdot 2Mg(OH)_2$ is useful in bleaching and sanitizing applications.

16 Claims, No Drawings

PROCESS FOR THE PRODUCTION OF DIBASIC MAGNESIUM HYPOCHLORITE

This application is a continuation-in-part of U.S. Ser. No. 968,605, filed Dec. 11, 1978, now abandoned, and U.S. Ser. No. 129,812, filed Mar. 12, 1980, now abandoned.

This invention relates to a process for the preparation of dibasic magnesium hypochlorite. Dibasic magnesium hypochlorite is useful as a bleaching and sanitizing agent.

Dibasic magnesium hypochlorite, corresponding to the formula:

$$Mg(OCl)_2 \cdot 2\, Mg(OH)_2$$

has been prepared by the reaction of an alkaline aqueous solution of a hypochlorite with an acidic aqueous solution of a magnesium salt, as described in U.S. Pat. No. 3,582,265, issued June 1, 1971, to J. J. Bishop and S. I. Trotz. In this process, a solution containing at least about 15 percent by weight of magnesium chloride or nitrate is admixed with a hypochlorite solution containing from 2 to 10 gram moles per liter of hypochlorite ion while maintaining the pH of the reaction mixture between 3 and 7. While this process is satisfactory for the production of dibasic magnesium hypochlorite, low rates of addition of the hypochlorite solution to the reaction mixture are required to avoid the precipitation of magnesium hydroxide. These slow addition rates of hypochlorite lead to the formation of undesirable amounts of chlorate ion reducing product yield. In addition, this process produces dilute slurries of dibasic magnesium hypochlorite in large volumes of solutions. Waste solutions containing available chlorine and chlorate ion are thus produced which must be properly disposed of and chlorine values are lost which result in an undesired expense.

U.S. Pat. No. 4,071,605 describes dibasic magnesium hypochlorite production by the reaction of a solid granular magnesium salt with a solid hypochlorite salt where at least one of the salts is present as a hydrate. This process produces a finer crystalline product which is less readily separated from the reaction mixture than desired. In addition, to obtain the solid hypochlorite salt employed, a drying step is required which results in increased energy requirements and some loss in available chlorine values.

Therefore, there is a need for an improved process for the production of dibasic magnesium hypochlorite which does not employ solutions as reagents while having reduced energy requirements.

It is an object of the present invention to provide a process for the production of dibasic magnesium hypochlorite in which the product can be readily separated and recovered.

Another object of the present invention is to provide a process for the production of dibasic magnesium hypochlorite having an increased reaction rate.

An additional object of the present invention is to provide a process for the production of dibasic magnesium hypochlorite having reduced processing and energy costs.

A further object of the present invention is to provide a process for the production of dibasic magnesium hypochlorite having increased crystal sizes which are readily separated.

A still further object of the present invention is to provide a process for the production of dibasic magnesium hypochlorite having reduced requirements for the disposal of waste solutions containing available chlorine.

These and other objects of this invention are accomplished in a process for the production of dibasic magnesium hypochlorite which comprises reacting a magnesium salt with an aqueous slurry of a crystalline hypochlorite salt selected from the group consisting of alkali metal hypochlorites and calcium hypochlorite, and a chloride ion source to form a reaction mixture, said slurry having a solids content of from about 10 to about 90 percent by weight of the crystalline hypochlorite salt, evolving chlorine gas from said reaction mixture, and recovering said dibasic magnesium hypochlorite therefrom.

In the novel process of the present invention one reagent is a concentrated slurry of a hypochlorite selected from the group consisting of alkali metal hypochlorites and calcium hypochlorite. Suitable alkali metal hypochlorites include lithium hypochlorite and sodium hypochlorite. The slurries have a solids content of crystalline hypochlorite in amounts of from about 10 to about 90, preferably from about 20 to about 80, and more preferably from about 35 to about 65 percent by weight.

Slurries of calcium hypochlorite are produced in known ways, for example, by chlorinating a slurry of lime in the presence of an alkali metal hydroxide or a concentrated solution of an alkali metal hypochlorite; or reacting a lime slurry with a solution of hypochlorous acid. To obtain slurries having concentrations of calcium hypochlorite in the more preferred range of 35 to 65 percent by weight, a more dilute slurry is concentrated, for example, by a solid-liquid separation process such as filtering or centrifuging to separate a moist cake of calcium hypochlorite dihydrate crystals from a solution. The moist cake separated generally contains from about 35 to about 65 percent by weight of calcium hypochlorite dihydrate crystals and from about 35 to about 65 percent by weight of a saturated solution of calcium hypochlorite. Where the calcium hypochlorite is prepared by a method which employs an alkali metal hydroxide or an alkali metal hypochlorite, the moist cake may contain from about 2 to about 15 percent by weight of an alkali metal chloride. Suitable processes for producing calcium hypochlorite slurries suitable for use in the present invention are, for example, those of U.S. Pat. No. 3,954,948 issued May 4, 1976, to W. J. Sakowski and U.S. Pat. No. 3,767,775 issued Oct. 23, 1973, to S. Tatara et al.

Concentrated slurries of alkali metal hypochlorites are obtained, for example, by the chlorination of concentrated alkali metal hydroxide solutions containing from about 30 to about 50 percent by weight of the alkali metal hydroxide. Cooling of a concentrated sodium hypochlorite solution will form a precipitate of a hypochlorite hydrate which can be separated, for example, by filtering, to recover the concentrated slurry employed in the novel process of the present invention. Lithium hypochlorite slurries can be obtained by the gradual evaporation of a lithium hypochlorite solution.

Concentrated aqueous slurries containing from about 35 to about 65 percent by weight of solid crystalline calcium hypochlorite are the preferred hypochlorite reactant.

Non-aqueous slurries of the hypochlorite salt in which liquids such as alkyl ketones, alkyl cyanides, alkyl esters of alkanoic acids or alcohols such as tertiary butanol may be employed in the process of the present invention.

Any magnesium salt capable of reacting with a slurry of hypochlorite salt to form dibasic magnesium hypochlorite may be employed as a reactant. Typical examples of suitable magnesium salts are those selected from the group consisting of magnesium acetate, magnesium carbonate, magnesium chlorate, magnesium perchlorate, magnesium chloride, magnesium chromate, magnesium nitrate, and magnesium sulfate, and hydrates thereof. In forming the reaction mixture with the hypochlorite slurry, the magnesium salt may be added as a solid salt or as a slurry in a liquid such as water. Where both reactants are added to the reaction mixture as slurries, the slurries should be sufficiently concentrated to provide a total water content of the reaction mixture of no more than about 60, preferably no more than about 50, and more preferably no more than about 40 percent by weight of the reaction mixture. The total water content includes free water and water of hydration. The rate of reaction between the magnesium salt and the hypochlorite salt is inhibited by the presence of large amounts of water. In a preferred embodiment, a solid magnesium salt is employed as the reactant.

In selecting solid magnesium salts as reactants, it is preferred that those salts be selected which are commercially available and economic to use and that, if a by-product calcium salt is produced, the calcium salt be more soluble in water than dibasic magnesium hypochlorite to facilitate separation of the products. Preferred magnesium salts include magnesium acetate, magnesium chloride, or magnesium nitrate, with magnesium chloride being particularly preferred.

The process of the present invention is carried out by admixing suitable proportions of the magnesium salt with the hypochlorite slurry. Molar ratios of the magnesium ion to the hypochlorite ion in the reaction mixture are generally of from about 0.4:1.0 to about 2.0:1.0, with molar ratios of from about 0.75:1.0 to about 1.0:1.0 being preferred. The process may be conducted batchwise or in a preferred embodiment as a continuous reaction. In a batch process, the reactants are added as rapidly as possible to provide the desired reaction rates. The order of addition with respect to the reactants is immaterial and any order of addition may be employed. Suitable rates of addition in a batch process are those greater than 1.5 gram mole of hypochlorite ion per kilogram of magnesium salt per hour, preferably at least 2 gram moles of hypochlorite ion per kilogram of magnesium salt.

In a continuous process, reactants are fed continuously to the reaction mixture in amounts suitable for maintaining the molar ratios previously specified.

The reaction between the magnesium salt and the slurry of crystalline hypochlorite salt is believed to take place according to the following equations in which the required components are expressed in their ionic form:

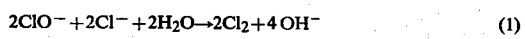
$$2ClO^- + 2Cl^- + 2H_2O \rightarrow 2Cl_2 + 4OH^- \quad (1)$$

$$3Mg^{++} + 4OH^- + 2ClO^- \rightarrow Mg(OCl)_2 \cdot 2Mg(OH)_2 \quad (2)$$

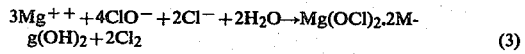
$$3Mg^{++} + 4ClO^- + 2Cl^- + 2H_2O \rightarrow Mg(OCl)_2 \cdot 2Mg(OH)_2 + 2Cl_2 \quad (3)$$

where equation (3) expresses the overall reaction.

As shown in equations (1) and (3), the presence of chloride ion is required in the reaction mixture. Although commercially produced slurries of calcium hypochlorite or alkali metal hypochlorites such as sodium hypochlorite contain chlorides, the amount may be insufficient to supply the stoichiometry required in Equation (3). Sufficient amounts of chloride ion are present where magnesium chloride is the source of magnesium ions. However, should other magnesium salts be reacted with, for example, slurries of pure crystalline hypochlorite salts, sufficient chloride ion must be added to provide the reaction mixture with molar ratios of chloride ion to hypochlorite ion of from about 1:2 to about 1:1, and preferably from about 1:2 to about 1.25:2. Suitable sources of chloride ion include alkali metal chlorides such as sodium chloride or lithium chloride and alkaline earth metal chlorides such as magnesium chloride or calcium chloride, with sodium chloride or magnesium chloride being preferred.

High rates of addition and high rates of reaction are desired so that chlorine gas is rapidly evolved from the reaction mixture. This enables the evolved chlorine to be recovered and, for example, recycled to the calcium hypochlorite process. At low rates of addition and subsequently low reaction rates such as those employed in a process in which the reactants are in solution, the chlorine is evolved slowly and considerable amounts of chlorate ion are formed in the solution. For example, generally about 25 percent or more of the available chlorine in the solution is converted to chlorate ion. Soluble chlorine cannot be recovered by economically feasible means and in addition, waste solutions containing available chlorine and chlorate ion must be treated before they can be properly disposed of. The rate of reaction is thus evidenced by the rate of chlorine evolution. Suitably, the reaction vessel is closed and is equipped with or associated with means for recovering the chlorine gas. The reaction vessel is also equipped with means for agitating or stirring the reaction mixture to provide suitable contact between the reactants and to facilitate the release of chlorine gas formed. Cessation of chlorine evolution is evidence of the completion of the reaction.

Any suitable temperature may be employed, for example, those in the range of from about 0° to about 75° C. and preferably from about 15° to about 50° C.

Dibasic magnesium hypochlorite crystals produced during the reaction are sufficiently large and unagglomerated to permit their being readily separated and recovered from the liquor containing a dissolved magnesium salt. The liquor also contains dissolved calcium and/or alkali metal salts. The solid dibasic magnesium hypochlorite is separated, washed, and dried.

The liquor may be reacted with an alkali metal hydroxide or carbonate to precipitate and recover magnesium hydroxide or magnesium carbonate from a solution of the alkali metal salt. Magnesium carbonate may be returned to the reaction mixture in a slurry or preferably, dried and recycled as a solid salt. Magnesium hydroxide may be reacted with an acid such as hydrochloric acid to produce magnesium chloride in a form suitable for use as the magnesium reactant.

Where dissolved calcium is present in the liquor, treatment of the liquor with an alkali metal hydroxide, subsequent to the removal of magnesium, produces calcium hydroxide and an alkali metal salt. The calcium hydroxide may be used in preparing the calcium hypochlorite slurry. Where the salt in the solution is that of an alkali metal chloride, it may be used in the preparation of brine for electrolysis in the production of chlorine and alkali metal hydroxides.

Chlorine gas evolved may be recovered, for example, by absorption in an alkali such as lime or sodium hydroxide to form calcium hypochlorite or sodium hypochlorite which may be suitably recycled as reactants to the process. If desired, an inert gas such as nitrogen or air may be used to purge the reaction mixture to facilitate chlorine recovery.

In the process of the present invention for producing dibasic magnesium hypochlorite, the recovery of chlorine values is nearly quantitative, and the disposal of waste streams containing available chlorine is minimized.

The novel process of the present invention produces dibasic magnesium hypochlorite crystals which can be readily recovered from the reaction mixture. The process provides a reaction rate which is suitable for the continuous production of dibasic magnesium hypochlorite. By employing as a reactant, a slurry of a hypochlorite salt, the present process can be readily integrated with commercial processes for producing these hypochlorites while reducing costs for energy as the hypochlorite salt need not be dried.

The following examples are presented to illustrate the invention more fully. All parts and percentages are by weight unless otherwise specified.

EXAMPLE 1

Anhydrous magnesium chloride (1.15 moles, 0.1095 kg) was charged to a reaction vessel equipped with a mechanical stirrer and a nitrogen purge. A filter cake containing 39 percent by weight of neutral $Ca(OCl)_2 \cdot 2H_2O$ (1.37 moles) was added to the reactor at a rate of 6.3 gram moles of hypochlorite ion per kilogram of $MgCl_2$ per hour. The reaction mixture had a molar ratio of magnesium ion to hypochlorite ion of 0.84:1. The mixture was stirred at room temperature for about 20 hours, during which time the evolved chlorine was purged and absorbed in a scrubber containing a sodium hydroxide solution (238 g of 50% NaOH and 556 g $H_2O$). The dibasic magnesium hypochlorite product was isolated by slurrying the reaction mixture in water, stirring for about 15 to 30 minutes, filtering and washing the filter cake with sufficient water to remove soluble salts. The slurry filtered quite rapidly owing to the relatively large crystal size of the product. The filter cake was dried at 50°–60° C. to provide dibasic magnesium hypochlorite product having an available chlorine content of 53.5 percent. The available chlorine converted to chlorate ion in the reaction solution was less than 6 percent. Analysis of the scrubber solution containing sodium hypochlorite showed the presence of 1.28 moles of available chlorine, corresponding to a chlorine recovery of 47 percent, based on the calcium hypochlorite charged.

EXAMPLE 2

Example 1 was repeated in a 300 gallon, glass-lined reactor fitted with an agitator and $N_2$ purge. The reactor was charged with 220.5 lb. (100.1 kg) of anhydrous $MgCl_2$ (technical grade). This was followed by gradual addition of 435.6 lb. of a filter cake containing 50 percent by weight of $Ca(OCl)_2 \cdot 2H_2O$ and about 8 percent by weight of sodium chloride. The addition rate for hypochlorite ion was 2.3 gram moles per kilogram of $MgCl_2$ per hour. The reaction mixture contained a molar ratio of magnesium ion to hypochlorite ion of 0.82:1.00. A small amount of additional water (60 lbs.) was added during the course of the reaction to improve stirrability and to reduce foaming caused by $Cl_2$ evolution. The mixture was stirred for about 16 hours and the evolved $Cl_2$ purged and absorbed in aqueous caustic. The reaction mixture was diluted with $H_2O$, stirred for about 30 minutes and filtered in a polypropylene plate and frame filter. After sufficient washing, the dibasic magnesium hypochlorite filter cake was dried at 50°–60° C. in a vacuum tray dryer.

What is claimed is:

1. A process for the production of dibasic magnesium hypochlorite which comprises reacting a magnesium salt, an aqueous slurry of a crystalline hypochlorite salt selected from the group consisting of alkali metal hypochlorites and calcium hypochlorite, and a chloride ion source to form a reaction mixture, said slurry having a solids content of from about 10 to about 90 percent by weight of said hypochlorite salt, evolving chlorine gas from said reaction mixture, the molar ratio of magnesium ion to the hypochlorite ion being from about 0.4:1 to about 2.0:1.0 and recovering said dibasic magnesium hypochlorite therefrom.

2. The process of claim 1 which said hypochlorite salt is calcium hypochlorite.

3. The process of claim 1 in which said hypochlorite salt is an alkali metal hypochlorite selected from the group consisting of lithium hypochlorite and sodium hypochlorite.

4. The process of claim 2 in which said magnesium salt is added as an aqueous slurry and said reaction mixture has a total water content of no more than about 60 percent by weight.

5. A continuous process for the production of dibasic magnesium hypochlorite which comprises:
   a. admixing a solid magnesium salt with an aqueous slurry having a solids content of from about 20 to about 80 percent by weight of calcium hypochlorite, and a chloride ion source, the molar ratio of the magnesium ion to the hypochlorite ion being from about 0.4:1.0 to about 2.0:1.0, to produce a reaction mixture containing dibasic magnesium hypochlorite, chlorine gas, and a solution containing dissolved calcium and magnesium values;
   b. evolving chlorine gas from said reaction mixture;
   c. separating said solid dibasic magnesium hypochlorite from said solution;
   d. treating said solution with an alkali metal hydroxide to form a slurry of magnesium hydroxide in a solution containing dissolved calcium values; and
   e. separating said magnesium hydroxide from said solution.

6. The process of claim 2 or claim 5 in which said magnesium salt is selected from the group consisting of magnesium acetate, magnesium carbonate, magnesium chlorate, magnesium perchlorate, magnesium chloride, magnesium chromate, magnesium nitrate, magnesium sulfate, and hydrates thereof.

7. The process of claim 6 in which said chloride ion source is selected from the group consisting of alkali metal chlorides, magnesium chloride, and calcium chloride.

8. The process of claim 7 in which said slurry contains from about 35 to about 65 percent by weight of said hypochlorite salt.

9. The process of claim 8 in which said magnesium salt is magnesium chloride or magnesium nitrate.

10. The process of claim 5 in which said magnesium hydroxide is reacted with an acid to form a magnesium salt and returning said magnesium salt to step a.

11. The process of claim 10 in which said solution containing dissolved calcium values is treated with an alkali metal hydroxide to form a slurry of calcium hydroxide in a solution and recovering said calcium hydroxide from said solution.

12. A process for the production of dibasic magnesium hypochlorite which comprises reacting an anhydrous solid magnesium salt with an aqueous slurry of a crystalline hypochlorite salt selected from the group consisting of alkali metal hypochlorites and calcium hypochlorite and a chloride ion source to form a reaction mixture, said slurry having a solids content of from about 10 to about 90 percent by weight of said hypochlorite salt and a molar ratio of magnesium ion to hypochlorite ion of from about 0.4:1.0 to about 2.0:1.0, evolving chlorine gas from said reaction mixture, and recovering said dibasic magnesium hypochlorite therefrom.

13. the process of claim 6 in which said reaction mixture is purged with an inert gas.

14. A continuous process for the production of dibasic magnesium hypochlorite which comprises:
a. admixing a solid magnesium salt with an aqueous slurry having a solids content of from about 20 to about 80 percent by weight of calcium hypochlorite, and a chloride ion source to produce a reaction mixture containing dibasic magnesium hypochlorite, chlorine gas, and a solution containing dissolved calcium and magnesium values;
b. evolving chlorine gas from said reaction mixture;
c. separating said solid dibasic magnesium hypochlorite from said solution;
d. treating said solution with an alkali metal hydroxide to form a slurry of magnesium hydroxide in a solution containing dissolved calcium values;
e. separating said magnesium hydroxide from said solution; and
f. reacting said magnesium hydroxide with an acid to form a magnesium salt and returning said magnesium salt to said reaction mixture.

15. The process of claim 1 in which the rate of addition of hypochlorite ion is at least 2 gram moles per kilogram of magnesium salt per hour.

16. The process of claim 1 or claim 5 in which said molar ratio of magnesium ion to the hypochlorite ion is from about 0.75:1.0 to about 1.0:1.0.

* * * * *

UNITED STATES PATENT AND TRADEMARK OFFICE
CERTIFICATE OF CORRECTION

PATENT NO. : 4,380,533

DATED : April 19, 1983

INVENTOR(S) : John A. Wojtowicz

It is certified that error appears in the above-identified patent and that said Letters Patent is hereby corrected as shown below:

At Column 7, Claim 11, line 1, delete "10" and insert --14--.

Signed and Sealed this

Eighth Day of November 1983

[SEAL]

Attest:

GERALD J. MOSSINGHOFF

Attesting Officer

Commissioner of Patents and Trademarks